Oct. 19, 1937.     S. O. DODGE     2,096,610
THREAD CUTTING TEMPLE FOR LOOMS
Filed Oct. 14, 1936     2 Sheets-Sheet 1
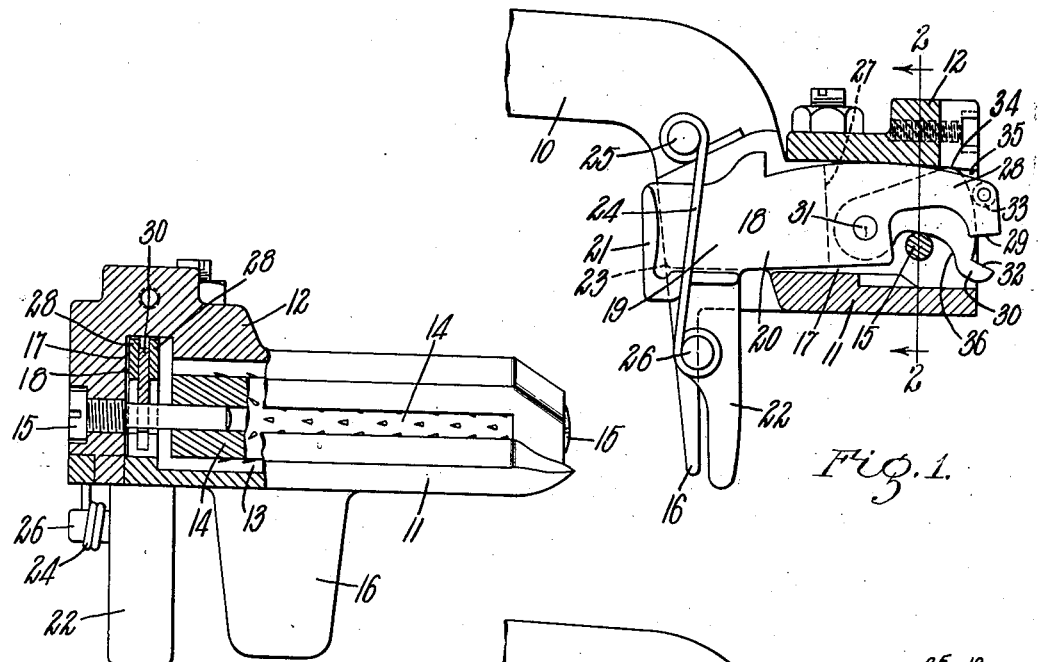
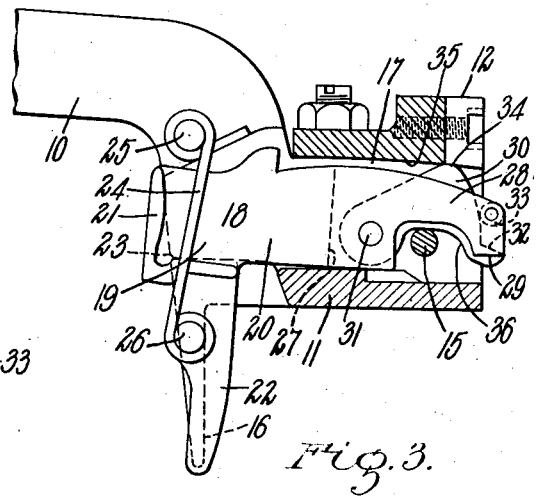
Inventor:
Sherwood O. Dodge.
by Franklin E. Low
Atty.

Oct. 19, 1937.     S. O. DODGE     2,096,610
THREAD CUTTING TEMPLE FOR LOOMS
Filed Oct. 14, 1936     2 Sheets-Sheet 2

Inventor:
Sherwood O. Dodge.
by Franklin E. Low
Atty.

Patented Oct. 19, 1937

2,096,610

UNITED STATES PATENT OFFICE 2,096,610

THREAD CUTTING TEMPLE FOR LOOMS

Sherwood O. Dodge, Medford, Mass., assignor to H. F. Livermore Co., Allston, Mass., a corporation of Massachusetts Application October 14, 1936, Serial No. 105,563

8 Claims. (Cl. 139—303)

This invention relates to improvements in thread cutting temples for looms and has for its primary object to provide a simple form of thread cutting device which will produce a more effective cutting action, will remain sharp longer, and will also have a longer period of effective usefulness with less tendency for the cutters to break than are the cutters in common use.

Another object of the invention is to provide a cutting device having two movable cutting members embodied therein, one of which is pivotally and slidably mounted in the head of the temple bar, and the other cutting member being pivotally attached to the first-mentioned member, thereby providing a cutter assembly which requires no adjustment and wherein all of the cutting members are mounted together and are insertable and removable in the temple head as a unit, and wherein all of the cutters may be sharpened without affecting the operation of the device.

Still another object of the invention is to provide a cutting device for a thread cutting temple which may be used as a replacement part for other thread cutting devices in common use, being applied to certain well-known types of temple structures without it being necessary to make any alterations therein, said cutting device comprising a main cutting member mounted to rock and to move forwardly and rearwardly in the usual guideway provided in the temple structure, and having another cutting member pivotally attached thereto and adapted to be actuated thereby and to co-operate therewith to sever a thread located therebetween.

The invention consists in a thread cutting temple for looms as set forth in the following specification and particularly as pointed out in the claims.

Referring to the drawings:

Fig. 1 is a vertical section through a temple head and cover therefor disclosing a thread cutting device embodying my invention mounted therein with the cutters thereof located in their open positions.

Fig. 2 is a partial end elevation and partial vertical section of the mechanism illustrated in Fig. 1, the sectioned portion being taken on the line 2—2 of Fig. 1.

Fig. 3 is a vertical section similar to Fig. 1 illustrating the cutters in their closed positions.

Fig. 4 is a top plan view of the cutting device of Figs. 1 to 3 inclusive, removed from the temple.

Like numerals refer to like parts throughout the several views of the drawings.

Figure 5:
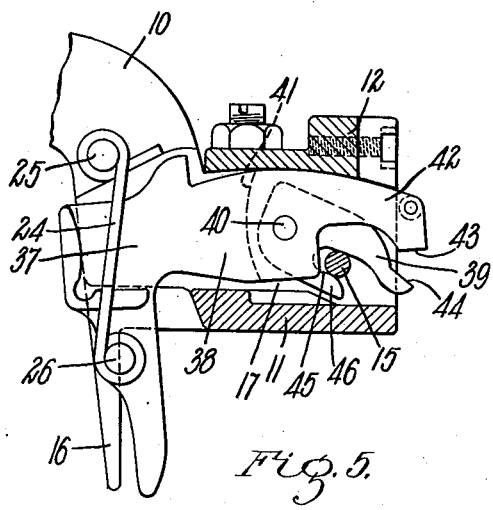
Figs. 5 and 6 are vertical sectional views similar to Figs. 1 and 3 respectively, illustrating a modified embodiment of my invention in its open and closed positions.

In the drawings, referring particularly to Figs. 1 to 4 inclusive, 10 is a temple bar having a head portion 11 formed integral therewith, and 12 is a cap or cover member for said head portion. Rotatably mounted within a space 13 provided between the head 11 and cover 12 is a temple roll 14, opposite end portions of which are journalled upon bearing pins 15 which are mounted in the cover 12. The head 11 is provided with a depending heel 16 which is adapted to be struck by the lay upon its beat-up movement to move the temple forward in the usual well-known manner. All of the members hereinbefore described are old and well known in the art and the head 11 and the cover 12 are provided with oppositely disposed grooved portions also well known in the art, which form a guideway 17 in which a thread cutting device 18 constituting my invention may be mounted without making any alteration in the before-mentioned parts.

The thread cutting device 18 in its preferred form comprises a cutting member 19 having a rigid flat sided body portion 20 embodied therein having oppositely projecting angular flanges 21 and a downwardly projecting heel 22 formed integral therewith. The flanges 21 are formed in a well-known manner to co-operate with a corner portion 23 of the temple bar 10 to form a pivot for the cutting member 19. A spring 24 of well known construction is mounted upon a stud 25 carried by the temple bar 10 and is connected to a post 26 provided upon the cutter heel in a manner to force the cutting member 19 rearwardly and normally hold it in the position illustrated in Fig. 1 with its rear end portion projecting outwardly through the slot 17 in the head 11. The cutting member 19 is slotted vertically at 27 to form parallel blade portions 28, each of which is provided with a cutting edge 29. Another cutting member 30 is pivotally attached to the cutting member 19 at 31 and is positioned in the slot 27 between the blade portions 28, and said cutting member 30 is provided with a cutting edge 32 which co-operates with the cutting edges 29 of the blades 28 to sever a filling thread during the operation of the loom with an effective scissors shearing action. A spacing member 33 is inserted between the blade portions 28 at the rear of the slot 27 to hold said blade portions correctly spaced with respect to the cutting member 30, and the latter is provided with a curved corner portion 34 which protrudes outwardly through the top of the slot 27 and engages a top surface 35 of the guideway 17, while a lower edge 36 of said cutter member 30 engages the periphery of the bearing pin 15 which supports the end of the temple roll that is positioned adjacent to the guideway.

In the operation of the loom, at each beat-up movement of the lay, the heel 22 of the cutting member 19 is contacted by said lay and said cutting member is first caused to be rocked upon the corner portion 23 of the temple bar 10 and then moved forwardly in the guideway 17 of said bar until the cutting edges 29 and 32 of the cutting members 19 and 30 respectively are concealed within said guideway. During the rocking movement of the cutting member 19 the blade portions 28 thereof move downwardly from the position illustrated in Fig. 1 to that illustrated in Fig. 3 and the cutting member 30 is caused to be rocked upon the member 19 in a manner to raise the cutting edge 32 thereof toward and into co-operative cutting relation with the cutting edges 29 and an effective severing of a filling thread that may be located between said cutting edges is assured. After the movement of the lay has caused the various parts of the thread cutting device 18 to be moved from the positions illustrated in Fig. 1 to the positions illustrated in Fig. 2 and the thread severing operation has been completed a continued movement of the lay will force the cutting device in its entirety forwardly in the guideway 17 until the severing portions of the cutting members that have protruded from the guideway 17 will be moved into and concealed within said guideway. When the lay moves in the opposite direction, the spring 24 functions to return the cutting members to their normal or open positions as illustrated in Fig. 1 and the engagement of the corner portion 34 of the cutting member 30 with the surface 35 of the guideway 17 causes the cutting member 30 to move downwardly to its open position.

Figure 6:
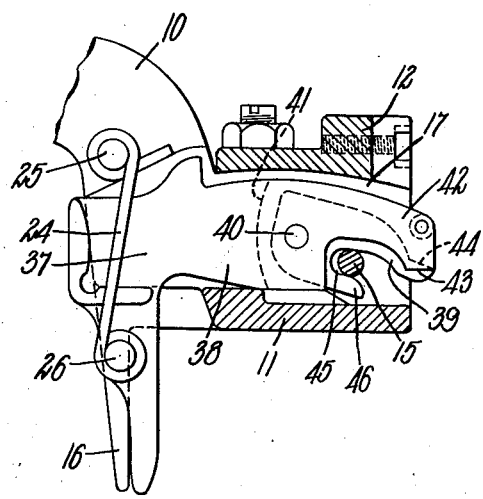

In Figs. 5 and 6 I have illustrated a modified embodiment of my invention in which a thread-cutting device 37 embodies therein a cutting member 38 having a cutting member 39 pivotally attached thereto at 40 and mounted in a vertical slot 41 provided therefor in said member 39. The cutting member 37 is exactly like the member 18 previously described except for slight minor details and embodies therein parallel blade portions 42, each of which is provided with a cutting edge 43 which co-operates with a cutting edge 44 of the cutting member 39 to shear a thread that may be located therebetween. In this embodiment of the invention the cutting member 39 is slotted at 45 to provide a projection 46 upon said cutting member which underlies the bearing pin 15, while the top edge of the slot 45 contacts with the top of said pin.

In the operation of the device the cutting members 38 and 39 are actuated by the lay to shear a filling thread in exactly the same manner as are the cutting members 19 and 30 previously described, but during the return movement of the cutting member 38 to its normal or open position the contact of the projection 46 of the cutting member 39 with the bearing pin 15 causes said cutting member 39 to assume its normal position.

Figure 7:
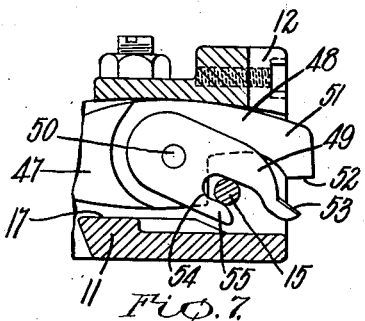
Fig. 7 is a vertical sectional view similar to Fig. 5, illustrating another modified embodiment of the invention.

In Fig. 7 another modified embodiment of my invention is illustrated in which a thread cutting device 47 embodies therein a cutting member 48 having a cutting member 49 pivotally attached thereto at 50. In this form of the device the cutting member 48 is provided with a single blade portion 51 having a cutting edge 52, and the cutting member 48 is pivotally attached to a face of the member 51 and has a cutting edge 53 which co-operates with the cutting edge 52 to shear a filling thread that may be located therebetween. In this embodiment of the invention the cutting member 49 is slotted at 54 to provide a projection 55 upon said cutting member which underlies the bearing pin 15, and the top edge of said slot 54 contacts with the top of said pin. This device functions in exactly the same manner as the device illustrated in Figs. 5 and 6 except that there are only two cutting blades instead of three.

Figure 8:
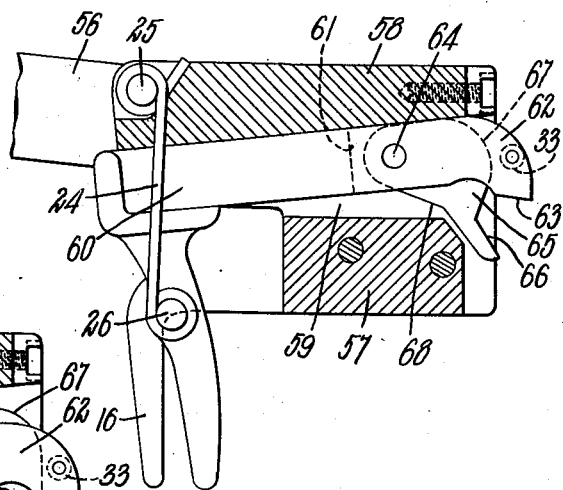
Figs. 8 and 9 are vertical sectional views similar to Figs. 1 and 3 respectively illustrating still another modified embodiment of my invention in its open and closed positions and mounted in a modified type of temple.
Figure 9:
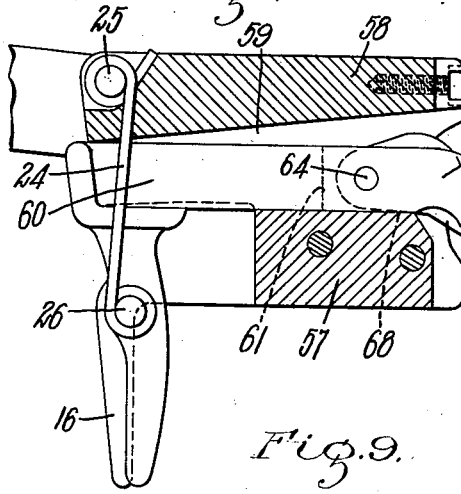

In Figs. 8 and 9 still another modified embodiment of the invention is illustrated in which a temple bar 56 is provided with a head portion 57 and cover 58 between which is a guideway 59 for a cutting device 60 slotted at 61 to provide parallel blade portions 62 each of which is provided with a cutting edge 63. Mounted in the slot 61 between the blade portions 62 and pivotally attached thereto at 64 is a cutting member 65 provided with a cutting edge 66 which co-operates with the cutting edges 63 of the blade portion 62 to sever a filling thread that may be located therebetween. In this form of the device the cutting member 65 is provided with a rounded upper edge portion 67 which is adapted to contact with the top edge of the guideway 59, while a lower edge portion 68 of said cutter member engages the lower edge of said guideway. In the operation of this embodiment of the invention the engagement of the lay with the heel of the cutting device 60 causes the latter to rock within the guideway 59, and the downward movement of the blade portion 62 thereof causes the lower edge of the cutting member 65 to contact with the lower edge of said guideway, thereby causing the cutting member to move from the position illustrated in Fig. 8 to the position illustrated in Fig. 9 thereby severing a filling thread that may be located between the cutting edges of the blades. During the upward movement of the blade portions 62 the rounded top edge portion 67 of the cutting member 65 engages the upper surface of the guideway 59 and the cutting member 65 will be returned to its normal or open position as illustrated in Fig. 8. In this form of the device a spacing member 33 for the blade portions 62 also constitutes a stop to limit the upward movement of the cutting member 65 between the blades 62 during the forward sliding movement of the cutting device 60 in its guideway 59.

In all of the various embodiments of this invention the co-operating cutting members are pivotally attached one to another to provide a scissors shearing action, and during the rocking and sliding movements of the various cutting devices within their respective guideways the lower cutting members are actuated toward and away from the upper cutting members by reason of their contact with adjacent portions of the temple structure which may be the temple roll bearing pins or the top or bottom surfaces of the guideway in the temple head.

The various cutting devices herein described are all self-contained and are insertable and removable as a unit in a temple head, and no adjustment of the cutting members relatively to each other is required. The co-operating cutting members are pivoted one to another to provide an effective scissors shearing action, and when the blades are in their open positions the lowermost blade is always located in a position to pick up the filling thread and lift said thread into cutting engagement with the upper blade or blades, and the cutting of said thread is thereby assured. When the cutting devices of this invention are utilized to replace other cutting devices well known in the art and which have a stationary cutter embodied therein, together with certain fastening and adjusting members, all of which require to be replaced occasionally, these latter-mentioned parts are all removed as it is evident that they are no longer required and later replacement expense is thereby eliminated.

I claim:

1. A thread cutting temple for looms comprising a temple head and cover therefor having a guideway extending therethrough, a cutter mounted to rock around a corner portion of said head in pivotal contact therewith and to slide forwardly and rearwardly in said guideway, and another cutter pivotally attached to said first-mentioned cutter and arranged to be actuated by the movement thereof and to co-operate therewith and with a fixed portion of the temple structure to sever a filling thread located between said cutters.

2. A thread cutting temple for looms comprising a temple head and cover therefor having a guideway extending therethrough, a cutter mounted to rock around a corner portion of said head in pivotal contact therewith and to slide forwardly and rearwardly in said guideway, and another cutter pivotally attached to said first-mentioned cutter and also arranged to contact with an adjacent fixed portion of the temple structure and during the movement of the first-mentioned cutter co-operate therewith and with said fixed portion to sever a filling thread located between said cutters.

3. A thread cutting temple for looms comprising a temple head and cover therefor having a guideway extending therethrough, a cutter mounted to rock around a corner portion of said head in pivotal contact therewith and to slide forwardly and rearwardly in said guideway, and another cutter pivotally attached to a vertical face of said first-mentioned cutter and having surfaces embodied therein arranged to contact with adjacent portions of the temple cover and head respectively and during the rocking movement of the first-mentioned cutter co-operate therewith and with said cover and head to sever a filling thread located between said cutters.

4. A thread cutting temple for looms comprising a temple head and cover therefor having a guideway extending therethrough, a cutter mounted to rock around a corner portion of said head in pivotal contact therewith and to slide forwardly and rearwardly in said guideway, said cutter having parallel blade portions embodied therein, and another cutter pivotally attached to said first-mentioned cutter between said blade portions and arranged to be actuated by the rocking movement thereof and to co-operate therewith and with a fixed portion of the temple structure to sever a filling thread located between said cutters.

5. A thread cutting temple for looms comprising a temple head and cover therefor having a guideway extending therethrough, a cutter mounted to rock around a corner portion of said head in pivotal contact therewith and to slide forwardly and rearwardly in said guideway, said cutter having parallel blade portions embodied therein, and another cutter pivotally attached to said first-mentioned cutter between said blade portions and having upper and lower edge portions embodied therein arranged to contact with adjacent portions of said cover and head respectively and during the rocking movement of the first-mentioned cutter co-operate therewith and with said contacting portions of the temple structure to sever a filling thread located between said cutters.

6. A thread cutting temple for looms comprising a temple head and cover therefor having a guideway extending therethrough, a cutter mounted to rock around a corner portion of said head in pivotal contact therewith and to slide forwardly and rearwardly in said guideway, said cutter having parallel blade portions embodied therein, a temple roll bearing pin, and another cutter pivotally attached to said first-mentioned cutter between said blade portions and having a slot provided therein to receive said temple roll bearing pin, said last-named cutter being actuated by the rocking movement of said first-mentioned cutter in co-operation with said bearing pin to sever a filling thread located between the cutters.

7. A thread cutting temple for looms comprising a temple head and cover therefor having a guideway extending therethrough, a cutter mounted to rock around a corner portion of said head in pivotal contact therewith and to slide forwardly and rearwardly in said guideway, a temple roll bearing pin, and another cutter pivotally attached to a vertical face of said first-mentioned cutter and having a slot provided therein to receive said temple roll bearing pin, said last-named cutter being actuated by the rocking movement of said first-mentioned cutter in co-operation with said bearing pin to sever a filling thread located between the cutters.

8. A thread cutting temple for looms comprising a temple head and cover therefor having a guideway extending therethrough, a cutter mounted to rock around a corner portion of said head in pivotal contact therewith and to slide forwardly and rearwardly in said guideway, said cutter having parallel blade portions embodied therein, and another cutter pivotally attached to said first-mentioned cutter between said blade portions and arranged to contact with upper and lower surfaces of said guideway and during the rocking movement of said first-mentioned cutter co-operate therewith and with the surfaces of the guideway to sever a filling thread located between said cutters.

SHERWOOD O. DODGE.